United States Patent [19]
Afanasiev et al.

[11] Patent Number: 5,472,924
[45] Date of Patent: Dec. 5, 1995

[54] CATALYSTS BASED ON HIGHLY DISPERSED METAL OXIDES, COMPRISING IN PARTICULAR ZIRCONIA

[75] Inventors: Pavel Afanasiev; Martine Boulinguiez, both of Villeurbanne; Michele Breysse, Caluire; Christophe Geantet; Thierry des Courieres, both of Lyon, all of France

[73] Assignee: Elf Aquitaine Production, Paris, France

[21] Appl. No.: 298,468

[22] Filed: Aug. 30, 1994

[30] Foreign Application Priority Data

Sep. 3, 1993 [FR] France .................. 93 10535

[51] Int. Cl.⁶ .................. B01J 23/38
[52] U.S. Cl. .................. 502/308; 502/313; 502/349; 502/439
[58] Field of Search .................. 502/308, 313, 502/349, 439

[56] References Cited

U.S. PATENT DOCUMENTS 5,262,273  11/1993  Durand et al. .................. 502/255

Primary Examiner—Asok Pal
Assistant Examiner—Timothy H. Meeks
Attorney, Agent, or Firm—Burgess, Ryan & Wayne

[57] ABSTRACT

Catalyst comprising at least one zirconium oxide, characterized in that it consists, for at least 85% of its weight, of a thermally stable support with a specific surface greater than or equal to 150 $m^2/g$ containing from 60 to 99 weight % of at least one zirconium oxide and from 40 to 1 weight % of at least one metal oxide of at least one metal chosen from the group consisting of metals from Groups V, VI and VII, noble metals such as ruthenium, osmium, rhodium, iridium and uranium, and the elements phosphorus, arsenic and sulphur, the support being obtained by the molten salts technique by introduction of a mixture of salts into a eutectic mixture of alkali metal nitrates or sulphates which, after dehydration, is maintained between 250° and 550° C., from 30 minutes to 5 hours.

13 Claims, No Drawings

CATALYSTS BASED ON HIGHLY DISPERSED METAL OXIDES, COMPRISING IN PARTICULAR ZIRCONIA

BACKGROUND OF THE INVENTION

1. Field of the Invention

The present invention relates to thermally stable catalysts based on metal oxides with a high dispersion of the active phase and with an improved specific surface, to their method of manufacture and to their applications in processes for the catalytic treatment of hydrocarbon and other compounds. It more particularly relates to the catalysts formed from supports containing zirconia.

2. Description of the Prior Art

A very large number of catalytic processes require the use of a catalyst comprising supports with a large specific surface, particularly sought for in oxidation processes and hydrotreating processes, on which are deposited a maximum of an active phase. The catalysts commonly used on an industrial scale generally consist of supports comprising one or a number of refractory oxides of metals such as zirconium, aluminium, silicon and titanium, the active phase consisting of transition metal sulphides or oxides. These catalysts are always prepared in at least two stages, a first stage of formation of the support and a second stage of impregnation of the latter with the active phase, the subsequent calcination and sulphurization treatments being targeted at converting the metal deposited in the salt form to oxides and to sulphides. The specific surface and the porosity of the support will depend on its method of manufacture. The dispersion of the active phase on this support will be better or worse according to whether the specific surface and the porosity of the support are larger or smaller and according to the experimental conditions of impregnation of the support. In particular, the interaction of the metal salt with the support is directly related to the acid/base properties of the support. Thus, when all the accessible sites of the support are occupied by the active metal ion of the salt present in the impregnation solution, the metal ion remaining in solution can no longer be deposited on the support in an evenly dispersed active form. In these conventional-type catalysts, the amount of active phase is therefore very quickly limited by the quality of the support, that is to say its capacity to absorb active metal ions, expressed by the number of metal atoms deposited per unit of surface area, which has been confirmed by many writers and experimentally revealed by analytical means such as UV spectroscopy and by X-ray Photoelectron Spectroscopy (XPS).

As the efficiency of a catalyst depends not only on the conditions of implementation of the catalytic process but also on its activity, which is directly related to the amount of active phase present on the support, many preparation methods have been proposed either for increasing the surface area of the support or for modifying its surface condition.

For certain supports, especially those containing zirconia, it has not been possible to obtain a specific surface as high as that of the most commonly used supports containing alumina. Moreover, supports based on zirconia have proved to have little thermal and hydrothermal stability. In the presence of structural dopants such as yttrium, lanthanum or silica, this thermal stability has been improved but still insufficiently.

In order to solve this problem of thermal instability of zirconia and in order to improve the specific surface of the catalysts containing zirconia, there has been developed a specific synthesis of supports containing refractory metal oxides, described in French Patent Application 2,661,169 of 20 Apr. 1990. It consists in heating a metal salt in a molten salt medium consisting of at least one alkali metal salt with an oxidizing effect at a temperature greater than that of the eutectic. By this process, it was possible to synthesize supports based on oxides of metals from Groups III and IV of the Periodic Table and, more particularly, supports based on refractory oxides such as zirconium, aluminium, silicon and titanium oxides, these oxides precipitating in the molten salt medium.

In order to further improve the specific surface of these supports, the idea was developed of preparing supports composed of mixed oxides and it was observed that the metal atoms distributed themselves homogeneously and evenly in the support for a not insignificant improvement in its specific surface. Of course, a catalytically active metal phase was subsequently deposited on these supports in a conventional way.

Contining this work on catalysts whose support is obtained by the so-called molten salts method, led to testing of a number of possible combinations of metal oxides with zirconia and it was noticed that certain combinations, especially combinations with salts of catalytically active metals, make it possible to increase, in an entirely unexpected way, the specific surface of zirconia-based supports. Moreover, it was discovered that these supports, which have become active by their composition and which are thermally stable, can be used directly as catalysts.

The present invention is therefore targeted at thermally stable catalysts for oxidizing and hydro-treating hydrocarbons comprising zirconium oxides with a higher specific surface than that known by those skilled in the art for a better dispersion of the active sites. The specific surface of these catalysts is measured by the BET method corresponding to the ASTM standard D3663.

SUMMARY OF THE INVENTION

The subject of the present invention is therefore a thermally stable catalyst comprising at least one zirconium oxide, characterized in that it consists, for at least 85 weight %, of a support with a specific surface greater than or equal to 150 m$^2$/g containing from 60 to 99 weight % of at least one zirconium oxide and from to 40 to 1 weight % of at least one metal oxide of at least one metal chosen from the group consisting of metals from Groups V, VI and VII, noble metals such as ruthenium, osmium, rhodium, iridium and uranium and the elements phosphorus, arsenic and sulphur, and in that the support is obtained in a single reaction stage which consists:

i) in mixing the mixture of salts of zirconium and of at least one other metal in a eutectic composition of alkali metal nitrates or sulphates;

ii) in dehydrating the mixture between 80° and 200° C. for from 30 minutes to 3 hours under an inert atmospheres iii) in then maintaining the mixture at a temperature between 250° and 550° C. for from 30 minutes to 5 hours;

iiii) and finally in washing the soluble oxidizing salts with water and, simultaneously, in isolating the support thus formed by filtering the crystallites composing it.

DESCRIPTION OF THE PREFERRED EMBODIMENTS

In a preferred embodiment of the invention, the support of the said catalyst according to the invention can advantageously comprise a metal/zirconium atomic ratio (Me/Zr) of between 0.02 and 0.20.

In contrast to the metals claimed in the oxide mixtures already obtained by the molten salts technique, the metals incorporated in the crystallites of the support of the present invention, in addition to the zirconium oxides, generally have a lower acidity. They act as a growth inhibitor of the zirconia crystallites by coprecipitating with them. This unexpected coprecipitation reduces the size of the crystals but promotes the production of a higher specific surface for the final catalyst than that expected if the support had been prepared by the molten salts technique known to those skilled in the art from zirconium and yttrium salts and then impregnated with at least one active phase of one of these metals.

It was thus observed that these metals of the group consisting of metals from Groups V, VI and VII, noble metals such as ruthenium, osmium, rhodium, iridium and uranium, and the elements phosphorus, arsenic and sulphur, in contrast to those used as structurant of zirconia, such as yttrium, were not substituted for one of the zirconium atoms of the stable solid solution $Zr_{(1-x)}Me_xO_2$ but come to be grafted at the surface of the zirconia during its nucleation and crystalline growth process to form species such as represented by the formula I below

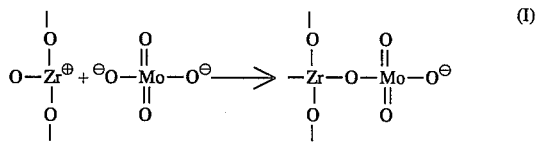

Additionally, it was observed that the presence of these metals close to the zirconia in the eutectic mixture unforeseeably promoted the anchoring to the surface of the zirconia of a second metal chosen from the group consisting of iron, cobalt, nickel and bismuth when the latter is introduced, preferably in the sulphate or nitrate form, into the eutectic mixture. The support then comprises, jointly with the zirconiumoxide, at least one mixed oxide of metal oxometallate type, the oxometallate corresponding to the first metal and the metal species to the second metal.

Moreover, when the zirconia was only mixed with one simple metal oxide necessary for the invention, that is to say a metal of the group consisting of metals from Groups V, VI and VII, noble metals such as ruthenium, osmium, rhodium, iridium and uranium, and the elements phosphorus, arsenic and sulphur, it was observed that the metal/zirconiumatomic ratio (Me/Zr) was between 0.02 and 0.1 and preferably between 0.05 and 0.08.

Preferably, in these supports, the zirconium oxides are combined with simple or mixed metal oxides obtained from metals chosen from the group consisting of molybdenum, vanadium, tungsten, niobium and chromium.

In the context of the present invention, the preferred mixed oxide in combination with the zirconium oxides is an oxometallate chosen from the group consisting of the molybdate, the vanadate, the niobate, the chromate and the tungstate of at least one metal chosen from the group consisting of iron, cobalt, nickel and bismuth.

In effect, it was observed that the presence close to the zirconia of molybdenum, vanadium, chromium, niobium or tungsten unforeseeably promotes the coprecipitation in molten salts medium of zirconia crystals with the metals iron, cobalt, nickel and bismuth, whereas, in their absence, the zirconia and these metals iron, cobalt, nickel and bismuth precipitate separately.

In another preferred embodiment of the present invention, as the support consists of these catalytically active crystallites, it can advantageously act as catalyst by itself. Such a support formed from catalytically active crystallites is particularly advantageous as catalyst in that it is thermally stable and in that it combines a very high specific surface with a significant content of catalytically active metals.

The activity of this support can be further improved by the impregnation at the surface of the said support of 0 to 15 weight % of at least one metal chosen from the group consisting of metals from Groups V, VI and VII, noble metals such as ruthenium, osmium, rhodium, iridium and uranium, transition metals and the elements phosphorus, arsenic and sulphur, taken alone or as a mixture.

In a more favourable embodiment of the invention, the amount of catalytically active metal in the catalyst is optimized for optimum activity of the catalyst during the chemical reaction envisaged thus, the maximum metal/zirconium atomic ratio accessible will be 0.25. The preferred metals according to the invention impregnated in the surface are chosen from the group consisting of molybdenum, vanadium and tungsten, transition metals and bismuth.

Among the possible applications of the catalysts according to the invention, it will be preferable to use them in processes for the treatment of hydrocarbons and more particularly oxidation and hydrotreating processes.

The examples given below are aimed at illustrating the invention but not to limit the scope thereof.

EXAMPLE I

The present example is aimed at illustrating the superiority of the catalyst according to the invention compared with those obtained by techniques known to those skilled in the art with respect to their specific surface and to their thermal stability.

Thus, a number of samples were prepared:

Sample 1 is a conventional-type catalyst: it was prepared by dry impregnation of a γ-alumina (γ-$Al_2O_3$) support, with a specific surface equal to 250 $m^2$/g, with an ammonium heptamolybdate solution. After calcination, the catalyst contains 9.3 weight % of molybdenum;

Sample 2 is a zirconia prepared according to the method described in French Patent Application 2,661,169;

Sample 3 is a mixture of oxides of zirconium and of yttrium prepared according to the method described in French Patent Application 2,661,169; to obtain this sample, a 10 times molar excess of the eutectic salt of sodium nitrate and of potassium nitrate is added to zirconium oxychloride and to yttrium chloride, and the mixture is then maintained at 500° C. for 2 hours;

Sample 4 is a catalyst according to the invention: it is obtained by simultaneously grinding 10 g of zirconiumoxychloride, sold by Fluka, with 0.63 g of ammonium heptamolybdate, sold by Merck, in then adding to the mixture a 10 times molar excess of the sodium nitrate/potassium nitrate eutectic mixture, then dehydrating the whole mixture under an inert nitrogen atmosphere at 150° C. for 2 hours and finally in heating it at 500° C. for 2 hours. After cooling, the bath is washed with water in order to dissolve and remove the alkali metal salts, the whole mixture is then filtered and the crystals of Sample 4 are recovered. It is observed by UV spectrometry that the molybdenum is well dispersed in a slightly polymerized form, characterized by a UV band between 250 and 500 nm with a maximum at 300 nm;

Sample 5 is a vanadium/zirconia catalyst according to the invention prepared as Sample 4 but substituting for the heptamolybdate 2.72 g of vanadium acetylacetonate (Merck). The same absorption band, characteristic of the excellent dispersion of the vanadium at the surface of the zirconia, is observed by UV spectrometry;

Sample 6 is a tungsten/zirconia catalyst according to the invention prepared as Samples 4 and 5 but with 0.74 g of ammonium metatungstate (Aldrich). The same UV band appears, characteristic of the good dispersion of the tungsten at the surface of the zirconia.

The specific surfaces of these six samples were measured according to the BET method (ASTM standard D3663) after preparation and then after they had been calcined at 600° C. and at 800° C. The results are collected in Table 1 below.

TABLE I

| SAMPLE | Weight % of metal | Specific Surface ($m^2/g$) | | |
|---|---|---|---|---|
| | | After preparation | After calcination At 600° C. | At 800° C. |
| 1 | 9.3 | 210 | — | — |
| 2 | 0.0 | 140 | 100 | 2.5 |
| 3 | 4.7 | 130 | 120 | 60.0 |
| 4 | 4.7 | 220 | 160 | 68.0 |
| 5 | 2.0 | 225 | 170 | 60.0 |
| 6 | 10.0 | 200 | 180 | 63.0 |

It is observed from these results that, in order to obtain a support containing zirconia with a specific surface identical to that of a catalyst containing an alumina support (Sample 1), it is sufficient to implement the present invention, here Samples 4, 5 and 6. The preparation of solely zirconia or zirconia/yttrium supports by the so-called molten salts technique does not make it possible to achieve such surfaces.

In addition, the zirconia mixed with the metals claimed by the invention is observed to have a better thermal stability than the zirconia prepared alone by the molten salts technique.

EXAMPLE II

The present example is aimed at showing the superiority of the molybdenum-based catalysts according to the invention during hydrotreating of thiophene.

The following samples were therefore tested:

Sample 1, corresponding to an alumina support impregnated with molybdenum, as described in Example I;

Sample 7, corresponding to Sample 2 of Example I which is impregnated with an ammonium heptamolybdate solution so as to obtain a final molybdenum concentration in the catalyst of 6%;

Sample 4, corresponding to a catalyst according to the invention without additional impregnation by a molybdenum salt, described in Example I;

Sample 8, corresponding to Sample 4 of Example I which was impregnated with an ammonium heptamolybdate solution so as to obtain a final molybdenum concentration in the catalyst of 8%;

Sample 9, corresponding to the sample impregnated as Sample 8 but whose final molybdenum concentration is 12.7%.

All these samples were sulphurated in a hydrogen/hydrogen sulphide ($H_2/H_2S$) atmosphere at 400° C. for 4 hours and were then tested in order to hydrodesulphurize thiophene at 300° C. at atmospheric pressure in order to measure their catalytic activity. The results are collected in Table II below:

TABLE II

| SAMPLE No. | Weight % of Mo | ACTIVITY ($10^8$ mol/s · g) |
|---|---|---|
| 1 | 9.3 | 12 |
| 7 | 6.0 | 15 |
| 4 | 4.7 | 16 |
| 8 | 8.0 | 24 |
| 9 | 12.7 | 28 |

It is observed that the catalysts according to the invention, with or without impregnation by molybdenum (Samples 4, 8 and 9), have an activity at least equal if not superior to the catalysts containing an alumina support, even with a much lower molybdenum content (Sample 4 compared to Sample 1).

EXAMPLE III

The present example compares the results obtained in hydrodesulphurizing thiophene in the presence of catalysts containing sulphurated nickel/molybdenum active phases prepared conventionally and according to the process of the invention by the so-called molten salts method.

Three catalyst samples were prepared:

Sample 10 consists of a support, corresponding to Sample 4 according to the invention, which was impregnated successively with an ammonium heptamolybdate solution and then with nickel nitrate solution in order to obtain final concentrations with respect to the catalyst of 8.7 weight % molybdenum and 3.5 weight % nickel;

Sample 11 consists of a support obtained as in Sample 4 but substituting for the ammonium heptamolybdate an equiatomic mixture of ammonium heptamolybdate and of nickel nitrate (Ni/Mo molar ratio= 1), the said support being subsequently impregnated as in Sample 4 with an ammoniumheptamolybdate solution; the final concentrations with respect to the catalyst are 12.7 weight % molybdenum and 5.2 weight % nickel;

Sample 12 is an industrial hydrotreating catalyst comprising a sulphurated nickel/molybdenum mixed active phase on an alumina support, known as HR346 and marketed by Procatalyse.

As in Example II, Samples 10 and 11 were sulphurated before being tested by hydrotreating. The catalytic results are collected in Table III below.

TABLE III

| SAMPLE | ACTIVITY ($10^8$ mol/s · g) |
|---|---|
| 10 | 180 |
| 11 | 250 |
| 12 | 160 |

Although the preparations of Samples 10 and 11 were not optimized, they show a catalytic activity at least equal to, if not much greater than (see Sample 11), that of a commercial catalyst (Sample 12).

EXAMPLE IV

The present example compares the catalytic activity of Sample 11 according to the invention with that of the commercial catalyst or Sample 12 with respect to the hydrogenation of tetralin.

The catalytic test is carried out at 350° C., at a total pressure of 40 bars, under a hydrogenation atmosphere containing 1.5% hydrogen sulphide ($H_2S$), the tetralin flow rate being 165 ml/min over the catalyst tested.

It is observed that the activity of Sample 11 ($10 \times 10^8$ mol/s.g) is much greater than that of the commercial catalyst (Sample 12, $5.8 \times 10^8$ mol/s.g), which confirms the superiority of the catalyst according to the invention compared with the commercial catalysts commonly used in industry.

We claim:

1. A catalyst comprising at least one zirconium oxide and, wherein at least 85% of the catalyst weight is comprised of a thermally stable support with a specific surface greater than or equal to 150 m²/g said support containing from 60 to 99 weight % of at least one zirconium oxide and from 40 to 1 weight % of at least one metal oxide of at least one metal selected from the group consisting of metals from Groups V, VI and VII, noble metals and the elements phosphorus, arsenic and sulphur and wherein the support is obtained in a single reaction stage which consists of:
   a) mixing salts of zirconium and at least one other metal in a eutectic composition of alkali metal nitrates or sulphates;
   b) dehydrating the mixture under an inert atmosphere between 80° and 200° C. for 30 minutes to 3 hours;
   c) maintaining the aforesaid mixture at a temperature between 250° and 550° C. for 30 minutes to 5 hours;
   d) and isolating the support thus formed by washing oxidizing alkali metal salts thus formed with water and simultaneous filtration of the crystals thus formed.

2. A catalyst according to claim 1 wherein the noble metal is selected from the group consisting of ruthenium, osmium, rhodium, iridium and uranium.

3. A catalyst according to claim 1 wherein the metal/zirconium atomic ratio (Me/Zr) in the support is between 0.02 and 0.20.

4. A catalyst according to claim 1 wherein the support comprises, jointly with at least one zirconium oxide, at least one mixed oxide of at least one metal said metal being selected from the group consisting of (a) metals from groups V, VI and VII, (b) noble metals selected from the group consisting of ruthenium, osmium, rhodium, iridium and uranium and (c) a metal selected from the group consisting of iron, cobalt, nickel and bismuth.

5. A catalyst according to claim 1 wherein the eutectic mixture additionally contains a metal salt of at least one second metal selected from the group consisting of iron, nickel, cobalt and bismuth.

6. A catalyst according to claim 3 wherein the atomic ratio (Me/Zr) is between 0.02 and 0.1 in the support.

7. A catalyst according to claim 6 wherein the atomic ratio (Me/Zr) in the support is between 0.05 and 0.08 when the metal (Me) originates from one simple metal oxide.

8. A catalyst according to claim 1 wherein the metal oxides in combination with the zirconium oxides in the support are oxides of metals selected from the group consisting of molybdenum, vanadium, tungsten, niobium and chromium.

9. A catalyst according to claim 4 wherein the mixed oxide, in combination with the zirconium oxides in the support, is an oxometallate selected from the group consisting of a molybdate, a vanadate, a niobate, a chromate and a tungstate of at least one metal selected from the group consisting of iron, cobalt, nickel and bismuth.

10. A catalyst according to claim 1 comprising a support consisting of catalytically active crystallites.

11. A catalyst according to claim 1 comprising at least one metal impregnated on the support said metal being present in an amount up to 15% by weight, and said metal being selected from the group consisting of Groups V, VI and VII, noble metals, transition metals and the elements phosphorus, arsenic and sulphur, either alone or in combination.

12. A catalyst according to claim 11 wherein the maximum metals/zirconium atomic ratio in the catalyst is 0.25.

13. A catalyst according to claim 11 wherein the metals impregnated on the support are selected from the group consisting of molybdenum, vanadium, tungsten, transition metals and bismuth.

* * * * *